United States Patent
Guenther et al.

(10) Patent No.: US 10,137,939 B2
(45) Date of Patent: Nov. 27, 2018

(54) FASTENING ARRANGEMENT OF A RADIATOR TRIM AND A BUMPER ON A FRONT-END CARRIER OF A MOTOR VEHICLE

(71) Applicant: Daimler AG, Stuttgart (DE)

(72) Inventors: Alexander Guenther, Lorch (DE); Holger Jakobs, Dettenhausen (DE)

(73) Assignee: Daimler AG, Stuttgart (DE)

( * ) Notice: Subject to any disclaimer, the term of this patent is extended or adjusted under 35 U.S.C. 154(b) by 147 days.

(21) Appl. No.: 15/121,735

(22) PCT Filed: Feb. 7, 2015

(86) PCT No.: PCT/EP2015/000259
§ 371 (c)(1),
(2) Date: Aug. 25, 2016

(87) PCT Pub. No.: WO2015/128059
PCT Pub. Date: Sep. 3, 2015

(65) Prior Publication Data
US 2017/0015365 A1    Jan. 19, 2017

(30) Foreign Application Priority Data
Feb. 28, 2014   (DE) .................. 10 2014 002 994

(51) Int. Cl.
  *B62D 27/02*   (2006.01)
  *B60R 19/52*   (2006.01)
  *B60R 19/24*   (2006.01)

(52) U.S. Cl.
  CPC .............. *B62D 27/02* (2013.01); *B60R 19/24* (2013.01); *B60R 19/52* (2013.01); *B60R 2019/525* (2013.01); *B60R 2019/527* (2013.01)

(58) Field of Classification Search
  CPC .......... B62D 27/02; B60R 19/24; B60R 19/52
  (Continued)

(56) References Cited

U.S. PATENT DOCUMENTS 8,702,157 B2 *   4/2014   Hirose ................. B60R 19/52
                                                      180/68.6
2007/0182174 A1   8/2007   Nakayama et al.
(Continued)

FOREIGN PATENT DOCUMENTS

DE   43 36 591 A1   5/1994
DE   199 12 181 A1   9/2000
(Continued)

OTHER PUBLICATIONS

PCT/EP2015/000259, International Search Report dated Jun. 5, 2015 (Three (3) pages).
(Continued)

*Primary Examiner* — Joseph D. Pape
(74) *Attorney, Agent, or Firm* — Crowell & Moring LLP

(57) ABSTRACT

A fastening arrangement of a radiator trim and a bumper on the front-end carrier of a motor vehicle is disclosed. The radiator trim and the bumper have at least one fastening part respectively, via which the radiator trim and the bumper are fastened on the front-end carrier by an allocated fastening element, preferably formed by a screw element. A connection element is provided on the fastening part of the radiator trim, the connection element being connected to a corresponding receiver of the fastening part of the bumper to form a mutual fastening device via which the radiator trim and the bumper are fastened on the front-end carrier by the fastening element.

9 Claims, 2 Drawing Sheets

(58) Field of Classification Search
USPC .......................................................... 293/115
See application file for complete search history.

(56) References Cited

U.S. PATENT DOCUMENTS

| | | |
|---|---|---|
| 2007/0222237 A1 | 9/2007 | Kemp et al. |
| 2011/0204680 A1 | 8/2011 | Fortin |

FOREIGN PATENT DOCUMENTS

| | | |
|---|---|---|
| DE | 103 07 974 A1 | 4/2004 |
| DE | 20 2005 019 756 U1 | 3/2006 |
| DE | 10 2006 026 255 A1 | 12/2007 |
| DE | 10 2012 008 832 A1 | 10/2013 |
| JP | 2-81259 | 6/1990 |
| JP | 2008-74350 A | 4/2008 |

OTHER PUBLICATIONS

Japanese Office Action issued in Japanese counterpart application No. 2016-552971 dated Oct. 3, 2017 (Three(3) pages).
Japanese Office Action issued in Japanese counterpart application No. 2016-552971 dated Jul. 11, 2017 with partial English translation (Five (5) pages).

\* cited by examiner

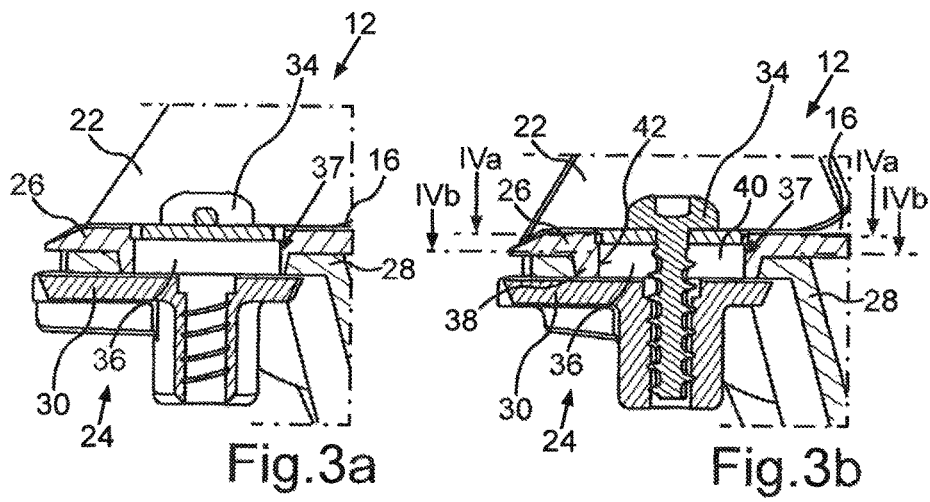
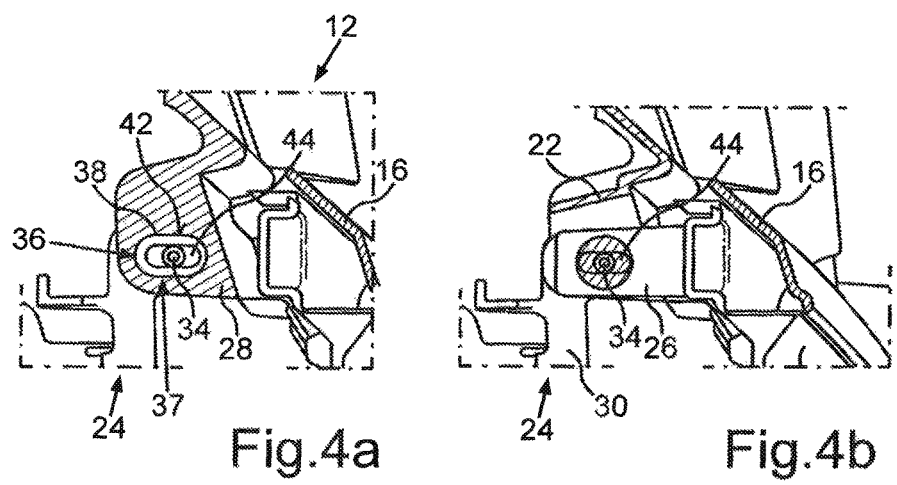

FASTENING ARRANGEMENT OF A RADIATOR TRIM AND A BUMPER ON A FRONT-END CARRIER OF A MOTOR VEHICLE

BACKGROUND AND SUMMARY OF THE INVENTION

The invention relates to a radiator trim for a motor vehicle. Furthermore, the invention relates to a bumper for a motor vehicle. Finally, the invention relates to a fastening arrangement of a radiator trim and a bumper on a front-end carrier of a motor vehicle.

It is generally known from the series production of passenger motor vehicles to fasten a respective radiator trim, which until now has also been known by the term radiator grille, and a respective bumper to a corresponding front-end carrier of a front module by means of several fastening parts. Until now, for this purpose, the respective fastening parts of the radiator trim and the bumper have been fixed to the front-end carrier via respectively separate fastening elements, in particular in the form of screw elements.

In particular, when fixing the bumper, it has thereby been necessary until now that the respective fastening parts thereof furthermore be equipped with so-called hole reinforcements, through which the respective screw element is guided and is screwed to the front-end carrier. This, in particular, results from the fact that the bumper, more specifically the bumper carrier thereof, is usually produced from a relatively soft material, and otherwise the respective connection between the bumper carrier and the front-end carrier would be subjected to corresponding setting procedures. Overall, the previous fastening arrangement of the radiator trim and of the bumper on the corresponding front-end carrier is relatively cost- and time-intensive during assembly.

The object of the present invention is therefore to create a radiator trim, a bumper and a fastening arrangement of the type referred to at the beginning, by means of which a cost- and time-saving fastening of the radiator trim and the bumper on the corresponding front-end carrier can be achieved.

This object is solved according to the invention by a radiator trim, by a bumper and a fastening arrangement. Advantageous embodiments having expedient developments of the invention are specified in dependent claims.

In order to create a radiator trim, by means which a time- and cost-saving production of a fastening arrangement of the radiator trim as well as a bumper on a front-end carrier of a motor vehicle can overall be achieved, it is provided that a connection element is provided on the fastening part of the radiator trim, which is able to be connected to a corresponding receiver of a fastening part of the bumper to form a mutual fastening device of the radiator trim and the bumper on the front-end carrier. Therefore, at least one connection element is to be provided on sides of the radiator trim in the region of the corresponding fastening part, on which, on the one hand, the corresponding receiver of the bumper fastening part is also able to be arranged, and via which, on the other hand, the mutual establishment of the radiator trim and of the bumper on the front-end carrier can occur.

Since the radiator trim frequently consists of a stiffer and stronger material than the bumper, in particular the bumper carrier, a stiffening of the corresponding receiver of the bumper is achieved in an advantageous manner by the connection element of the radiator trim, such that so-called hole reinforcements in the region of the receiver of the bumper carrier which have, until now, been usual, can be dispensed with. Rather, the connection element of the radiator trim assumes this reinforcing function of the receiver, which, for example, is formed as a passage opening within the bumper carrier. A further advantage of the connection element consists in that the mutual fastening device having the connection element of the radiator trim and the receiver of the bumper carrier can hereby be formed as a positive connection, such that this creates an inevitable, i.e., autonomous or automatic, relative positioning between the radiator trim and the bumper by inserting the connection element into the receiver, which is predominantly independent of tolerance. In other words, the radiator trim and the bumper therefore do not each need to be adjusted separately relative to the front-end carrier, but the mutual fastening device of the radiator trim and the bumper enable a position-accurate relative positioning of these two components such that, furthermore, only an alignment relative to the front-end carrier must occur.

In a particularly advantageous exemplary embodiment of the radiator trim, the connection element is formed on the radiator trim, i.e., is therefore formed in one piece with this.

In an advantageous exemplary embodiment of the radiator trim, the connection element is formed to be substantially sleeve-shaped for producing a positive connection to the receiver of the fastening part of the bumper. Such a sleeve-shaped design of the connection element has, in particular, the advantage that a corresponding, positive plug connection to the corresponding receiver of the fastening part of the bumper can hereby be produced in a simple manner and that, on the other hand, only a fastening element, in particular a screw element, needs to be plugged through the connection element in a simple manner to mutually fasten the radiator trim and the bumper on the front-end carrier.

For the autonomous alignment of the radiator trim and the bumper in the course of the mutual fastening thereof, it has proved to be advantageous to provide the dome-shaped or pin-shaped and preferably sleeve-shaped connection element provided on the radiator trim with an outer contour adapted to the receiver on the bumper in size and shape. In the case of a correspondingly tight tolerance between the connection element and the receiver, a very precise, reproducible alignment of radiator trim and bumper is ensured due to this connection of pin and hole.

In this context, it has furthermore been shown to be advantageous if the sleeve-shaped connection element has a passage opening for the fastening element, in particular the screw element, through which a guide for the fastening element is formed for tolerance compensation. Therefore, in an advantageous manner, in the case of a released screw element, the radiator trim and with it also the bumper can be displaced relative to the front-end carrier, in a spatial direction, in particular in the vehicle longitudinal direction. For this purpose, the passage opening is formed in the connection element of the radiator trim as an elongated hole.

To solve the object, a bumper is furthermore proposed. This has at least one fastening part, by means of which this can be connected to a corresponding front-end carrier in a time- and cost-effective manner. For this purpose, a receiver is provided on the fastening part of the bumper, which is able to be connected to a corresponding connection element of a fastening part of a radiator trim to form a mutual fastening device of the radiator trim and of the bumper on the front-end carrier. The advantages already explained above in connection with the radiator trim according to the invention here apply in the same way to the receiver provided on the fastening part of the bumper. Here, in a further embodiment of the invention, it is provided that the receiver can be designed particularly simply as a passage opening in the, for example, rod-like or flap-like fastening element of the bumper.

Furthermore, in order to create a fastening arrangement of a radiator trim and a bumper on the front-end carrier of a motor vehicle, which is able to be produced particularly time- and cost-effectively, it is provided that a connection element is provided on sides of the radiator trim in the region of the fastening part and a receiver is provided on sides of the bumper on the corresponding fastening part, which together form the fastening device already described above, via which the radiator trim and the bumper are fastened to the front-end carrier by means of the fastening element, in particular screw element. As well as the advantages already described above of the mutual relative positioning between the radiator trim and bumper by inserting the connection element into the receiver, the further advantage therefore results that both components are able to be fastened on the front-end carrier via one and the same fastening element, in particular the same screw element. Overall, it is therefore recognizable that, due to the inevitable and practically tolerance-free relative positioning of the radiator trim, on the one hand relative to the bumper and, on the other hand using the mutual determination of the two components on the front-end carrier, a particularly simple and cost-effective assembly can be achieved. Furthermore, the hole reinforcements required until now for reinforcing the corresponding receiver on sides of the bumper can be saved by the provision of the connection element on sides of the radiator trim, which leads to a further cost advantage.

Further advantages, features and details of the invention result from the description below of a preferred exemplary embodiment, as well as by means of the drawings.

BRIEF DESCRIPTION OF THE DRAWINGS

FIGS. 3a, 3b are respective cross-sectional views in sections of the fastening arrangement of the radiator trim and of the bumper on the front-end carrier according to FIGS. 2a and 2b along a respective sectional plane running in the vehicle vertical direction and in the vehicle longitudinal direction, wherein it is in particular recognizable that a connection element is provided on the fastening part of the radiator trim, which is connected to a corresponding receiver of the fastening part of the bumper to form a mutual fastening device, via which the radiator trim and the bumper are fastened by means of the mutual screw element on the front-end carrier; and FIGS. 4a, 4b are respective cross-sectional views in sections of the fastening arrangement along a respective sectional plane represented by the line IVa-IVa or IVb-IVb in FIG. 3b, running substantially horizontally, wherein it is recognizable from FIG. 4a that the connection element of the radiator trim and the receiver of the bumper form a substantially positive connection, and wherein, in particular when seen together with FIG. 4b, it is recognizable that a passage opening in the sleeve-shaped connection element of the radiator trim forms a guide for the associated screw element.

DETAILED DESCRIPTION OF THE DRAWINGS

Figure 1:
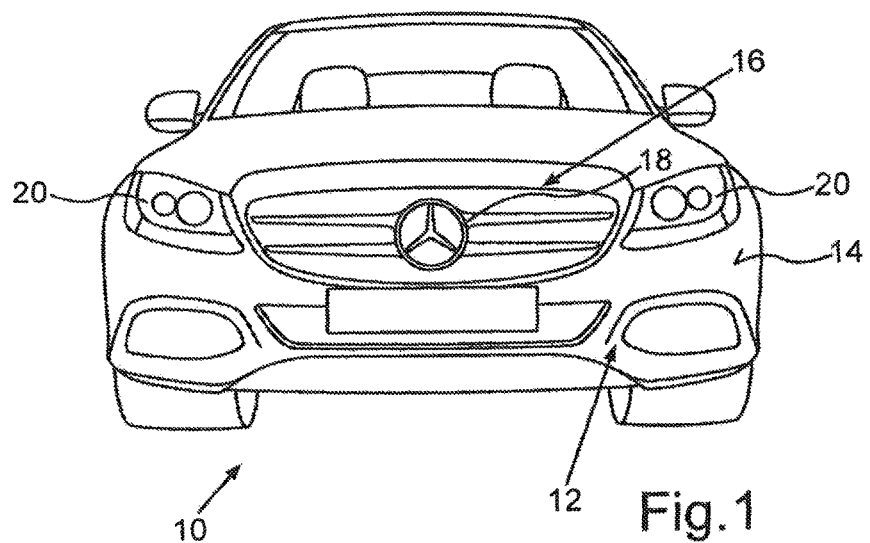
FIG. 1 is a front view onto a motor vehicle front part of a passenger motor vehicle having a bumper and a radiator trim arranged between respective lighting units, which are fastened on a front-end carrier of a front-end module of the motor vehicle which is not further recognizable.

In FIG. 1, a motor vehicle front part 10 of a passenger motor vehicle is depicted in a front view which has a bumper 12, of which substantially only a bumper trim 14 is recognizable. Furthermore, a radiator trim 16 in the form of a radiator grill bearing an emblem 18 is provided which substantially extends between respective lighting units 20, so-called headlights.

Figures 2A, 2B:
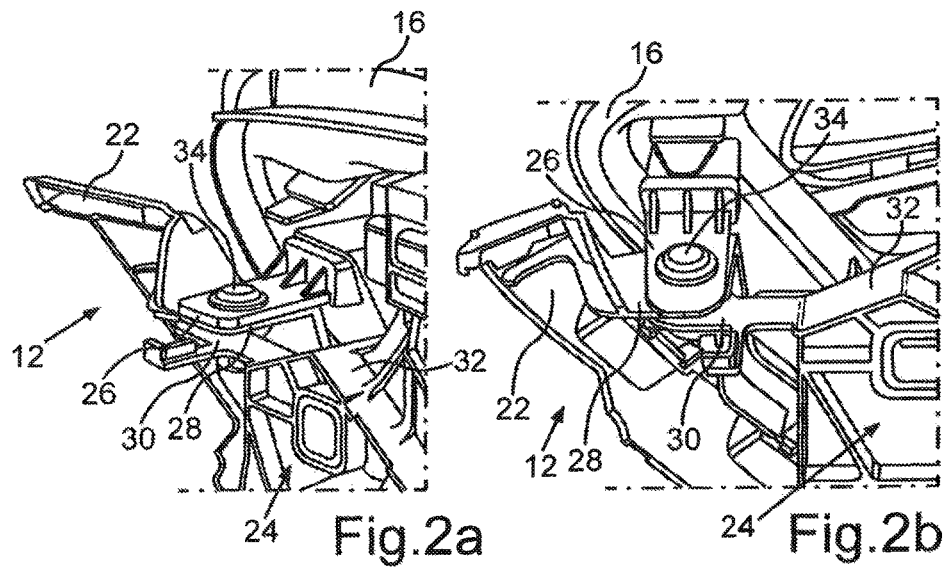
FIGS. 2a, 2b are respective rear views, in sections and perspectively at an angle from above, onto a fastening arrangement of the radiator trim and of a bumper carrier of the bumper on the front-end carrier of the motor vehicle according to FIG. 1, wherein the radiator trim and the bumper have at least one fastening part respectively, by means of which the radiator trim and the bumper are fastened to the front-end carrier by means of a mutual screw element.

In FIGS. 2a and 2b, a fastening arrangement of the radiator trim 16 recognizable in FIG. 1 and a bumper carrier 22 of the bumper 12 recognizable in FIG. 1 is depicted on a front-end carrier 24 of the motor vehicle in a respective perspective view in sections at an angle from above. Here, the corresponding components of the front module, so the bumper having the bumper carrier 22 carrying the bumper trim 14, the radiator trim 16, the lighting units 20 and, for example, also components of a radiator device of a combustion engine of the motor vehicle are fastened on the front-end carrier 24 in a known manner.

As is now recognizable from FIGS. 2a and 2b, a flap-like or rod-like fastening part 26 projects horizontally and extending backwards in the vehicle longitudinal direction from the radiator trim 16 produced presently from plastic material. Here, the fastening part 26 is supported on a laterally allocated fastening part 28 of the bumper carrier 22 of the bumper 12, which is presently designed substantially also as a flap or similar strip made from a plastic material and extends substantially horizontally and in the vehicle transverse direction. This fastening part 28 is supported in turn on an arm 30 which projects from a central part 32 of the front-end carrier 24, which is fastened for its part towards the back on the shell-side, towards to left vehicle side. Both the fastening part 26 and the fastening part 28 are presently fastened to the arm 30 of the front-end carrier 24 by means of a mutual fastening element in the form of a screw element 34 in a manner which is described in more detail below.

The fastening arrangement of these three components is, in particular, recognizable from FIGS. 3a and 3b, which show these in respective cross-sectional views in sections along a sectional plane running in the vehicle vertical direction or vehicle longitudinal direction. FIG. 3a here shows the arm 30 of the front-end carrier 24 and the fastening part 28 of the bumper carrier 22 in a cross-sectional view along the central longitudinal axis of the screw element 34. Furthermore, in FIG. 3b, the fastening part 26 of the radiator trim 16 is also depicted in cross-section.

In particular, it is recognizable from FIG. 3b here that—when seen in the state where the components are integrated into the motor vehicle—a connection element 36 projects downwards on the lower side from the fastening part 26 of the radiator trim 16, the connection element being formed to be substantially sleeve-shaped, having an outer wall 38 which limits a passage opening 40 for the screw element 34. This connection element 36 projects into a receiver 42 formed as a passage opening 40 of the flap-like fastening part 28 of the bumper carrier 22. This is evident in particular from FIG. 4a, which shows a cross-sectional view in sections of the fastening arrangement along a sectional plane marked by the line IVa-IVa in FIG. 3b and running horizontally.

Here, it is particularly recognizable that the sleeve-shaped connection element 36 not only projects into the receiver 42, but rather forms a connection device 37 with a positive connection. For this purpose, the receiver 42 is adapted in its elongated-hole cross-section to the corresponding cross-section of the sleeve-shaped connection element 36. Therefore, a connection device 37 is created by the corresponding design of the connection element 36 and the receiver 42, the connection device achieving an exact positioning of the radiator trim 16 relative to the bumper carrier 22 or to the bumper 12 overall on the respective vehicle side. Here, therefore, the sleeve-shaped connection element 36 is adapted in size and shape to the receiver 42 accordingly, such that the thus formed connection of pin and hole only has a very small tolerance.

Correspondingly, the connection element 36 is only moveable in the plug or extraction direction, so substantially in the vehicle vertical direction (z-direction) relative to the receiver 42, due to the non-rotationally symmetrical design of the connection element 36 and the receiver 42.

Due to the insertion or connection of the connection element 36 of the radiator trim 16 to the receiver 42 of the bumper carrier 22, not only is the described relative positioning of these components with respect to each other achieved, but furthermore in particular the fastening part 28 of the bumper carrier 22 is reinforced by the connection element 36. Usually, in particular the radiator trim 16 is designed from a correspondingly stable material as the bumper carrier 22. During the fastening of the bumper carrier 22, corresponding hole reinforcements in the form of metallic insert parts have therefore been used until now in the region of the corresponding receiver 42, the hole reinforcements, for example, preventing setting procedures. These hole reinforcements can now be dispensed with due to the respective sleeve-like connection element 36 which is also referred to as a so-called passage.

It is therefore recognizable from FIGS. 3a and 3b that the sleeve-like connection element 36 is coordinated in its axial thickness with the thickness of the flap-like fastening part 28 of the bumper carrier 22. If, as a consequence, the screw element 34 is tightened, a mutual fixing of the bumper carrier 22 and the radiator trim 16 is therefore achieved on the front-end carrier 24.

When FIG. 4a is seen together which FIG. 4b, which shows a further cross-sectional view in sections through the fastening arrangement analogously to FIG. 4a along a sectional plane represented by the line IVb-IVb in FIG. 3 and running substantially horizontally, it is in particular recognizable that the passage opening 40 of the sleeve-like connection element 36 is coordinated in its width with the diameter of the screw element 34. The guide 44 extends here—as is recognizable from FIGS. 4a and 4b—substantially in the vehicle longitudinal direction and horizontally. In this way it is possible to adjust the radiator trim 16 together with the bumper 12 or the bumper carrier 22 in the vehicle longitudinal direction relative to the front-end carrier 24. After the adjustment, the complete fastening arrangement can then be produced by both components—the bumper 12 and the radiator trim 16—being set relative to the front-end carrier 24 by means of one and the same screw element 34.

As is in particular recognizable from FIGS. 2a and 2b, the mutual fastening device 37 consisting of the connection element 36 and the receiver 42 of the respective fastening parts 26 or 28 is presently arranged in proximity to the corresponding lighting unit 20, such that the respectively allocated screw element 34 is accessible in a simple manner. Such a fastening arrangement is presently provided on the opposite vehicle side in the corresponding transfer region between the radiator trim 16 and the bumper carrier 22.

Overall it is therefore recognizable that, in the present fastening arrangement, on the one hand a relative positioning of the radiator trim 16 relative to the bumper 12 is achieved, and on the other hand the corresponding receiver 42 is reinforced on sides of the bumper carrier 22 in a simple manner by the connection element 36 of the radiator trim 16. Furthermore, a further substantial advantage is that this overall fastening device 37—consisting of the connection element 36 on sides of the fastening part 26 and the receiver 42 on sides of the fastening part 28—can be fixed on the front-end carrier 24 in a simple manner by means of only one screw element 34.

The invention claimed is:

1. A radiator trim for a motor vehicle, comprising:
a fastening part, wherein the radiator trim is fastenable to a front-end carrier of the motor vehicle by the fastening part and a fastening element; and
a connection element disposed in the fastening part, wherein the connection element projects downwards on a lower side from the fastening part and wherein the connection element is projectable into a receiver of a bumper fastening part to form a mutual fastening device of the radiator trim and of a bumper on the front-end carrier of the motor vehicle.

2. The radiator trim according to claim 1, wherein the connection element is substantially sleeve-shaped for production of a positive connection to the receiver of the bumper fastening part.

3. The radiator trim according to claim 2, wherein the sleeve-shaped connection element has a passage opening for the fastening element such that a guide is formed for the fastening element for a tolerance compensation.

4. A bumper for a motor vehicle, comprising:
a fastening part, wherein the bumper is fastenable to a front-end carrier of the motor vehicle by the fastening part and a fastening element; and
a receiver disposed on the fastening part, wherein the receiver is connectable to a connection element of a radiator trim fastening part to form a mutual fastening device of the bumper and of a radiator trim on the front-end carrier of the motor vehicle, wherein the connection element is disposed in the radiator trim fastening part and projects downwards on a lower side from the radiator trim fastening part and wherein the receiver is connectable to the connection element by the connection element projecting into the receiver to form the mutual fastening device.

5. The bumper according to claim 4, wherein the receiver is a passage opening for production of a positive connection to the connection element of the radiator trim fastening part.

6. A fastening arrangement of a radiator trim and of a bumper on a front-end carrier of a motor vehicle, comprising:
a first fastening part of the radiator trim; and
a second fastening part of the bumper;
wherein a connection element is disposed eft in the first fastening part of the radiator trim, wherein the connection element projects downwards on a lower side from the first fastening part and wherein the connection element projects into a receiver of the second fastening part of the bumper to form a mutual fastening device, and wherein the radiator trim and the bumper are fastened on the front-end carrier of the motor vehicle by the mutual fastening device and by a fastening element.

7. The fastening arrangement according to claim 6, wherein the connection element is substantially sleeve-shaped and wherein the receiver is a first passage opening in the second fastening part of the bumper.

8. The fastening arrangement according to claim 7, wherein the sleeve-shaped connection element has a second passage opening for the fastening element such that a guide is formed for the fastening element and wherein along the guide the radiator trim and the bumper are adjustable in a vehicle longitudinal direction relative to the front-end carrier of the motor vehicle for a tolerance compensation.

9. The fastening arrangement according to claim 6, wherein the mutual fastening device is disposed in proximity to a lighting unit.

* * * * *